(12) United States Patent
Yamane et al.

(10) Patent No.: US 9,481,086 B2
(45) Date of Patent: Nov. 1, 2016

(54) CONTROL METHOD FOR FLOATING-BASE ROBOTS INCLUDING GENERATING FEASIBLE MOTIONS USING TIME WARPING

(71) Applicant: DISNEY ENTERPRISES, INC., Burbank, CA (US)

(72) Inventors: Katsu Yamane, Township of O'Hara, PA (US); Yu Zheng, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 14/624,665

(22) Filed: Feb. 18, 2015

(65) Prior Publication Data

US 2016/0236349 A1    Aug. 18, 2016

(51) Int. Cl.
*G06F 19/00* (2011.01)
*B25J 9/16* (2006.01)
*B62D 57/032* (2006.01)

(52) U.S. Cl.
CPC ............. *B25J 9/1664* (2013.01); *B25J 9/1651* (2013.01); *B62D 57/032* (2013.01); *Y10S 901/01* (2013.01)

(58) Field of Classification Search
CPC .... B25J 9/1633; B25J 9/1692; B25J 9/1694; B25J 9/1674; B25J 9/1676; B25J 9/1669; G06N 3/008; B62D 57/032; Y10S 901/01; Y10S 901/19
USPC ........................ 700/245, 254, 260, 261, 262; 318/568.1, 568.11, 568.12, 434, 318/568.16, 568.17, 567; 901/28, 46, 48
See application file for complete search history.

(56) References Cited

U.S. PATENT DOCUMENTS

| 2004/0169484 A1* | 9/2004 | Iribe | B25J 9/1633 318/568.11 |
| 2004/0176875 A1* | 9/2004 | Iribe | G06N 3/008 700/245 |
| 2005/0055131 A1* | 3/2005 | Mikami | B62D 57/032 700/245 |
| 2005/0113973 A1* | 5/2005 | Endo | B25J 9/161 700/245 |
| 2005/0165507 A1* | 7/2005 | Shimizu | B62D 57/032 700/245 |

(Continued)

OTHER PUBLICATIONS

Dasgupta, Making feasible walking motion of humanoid robots from human motion capture data, May 1999, IEEE.*

(Continued)

*Primary Examiner* — Jerrah Edwards
*Assistant Examiner* — Rachid Bendidi
(74) *Attorney, Agent, or Firm* — Marsh Fischmann & Breyfogle LLP; Kent A. Lembke

(57) ABSTRACT

A control method, and a robot controller implementing the method, is provided that adapts human motions to floating-base humanoid robots with time warping techniques. The method of modifying a set of reference motions modifies the timeline of a reference motion so as to speed up or slow down one or more of the motions or motion segments. Through the use of time warping, the velocity and acceleration profiles of the motion are changed to turn an infeasible motion into a feasible one. The optimal time warping is obtained through a generalized motion feasibility index that quantifies the feasibility of a motion considering the friction constraint as well as the center-of-pressure (CoP) constraint. Due to the use of the motion feasibility index, the proposed motion adaptation method taught herein can be applied to motions on arbitrary terrains or with any number of links in contact with the environment.

13 Claims, 18 Drawing Sheets

(56) References Cited

U.S. PATENT DOCUMENTS

| | | | |
|---|---|---|---|
| 2005/0179416 A1* | 8/2005 | Iribe | B25J 9/1674 318/563 |
| 2005/0184697 A1* | 8/2005 | Iribe | B25J 9/1633 318/568.12 |
| 2009/0105878 A1* | 4/2009 | Nagasaka | B25J 13/084 700/245 |
| 2010/0250001 A1* | 9/2010 | Hodgins | B62D 57/032 700/261 |
| 2013/0131865 A1* | 5/2013 | Yamane | B62D 57/032 700/254 |
| 2015/0005941 A1* | 1/2015 | Milenkovic | B25J 9/163 700/262 |

OTHER PUBLICATIONS

Sok, Simulating Biped Behaviors from Human Motion Data, Jul. 2007, ACM Transactions on Graphics.*

* cited by examiner

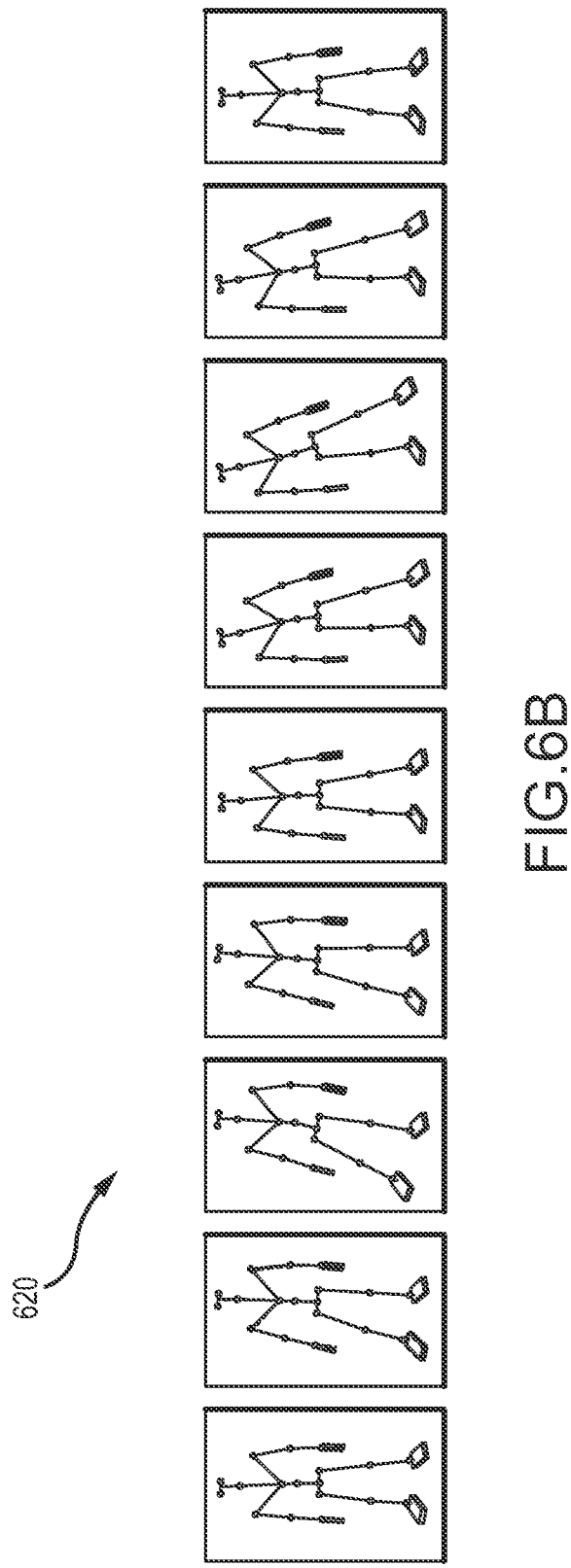

ed motion) for the floating-base robot. Then, the method

CONTROL METHOD FOR FLOATING-BASE ROBOTS INCLUDING GENERATING FEASIBLE MOTIONS USING TIME WARPING

BACKGROUND

1. Field of the Description

The present description relates, in general, to legged robots (e.g., biped humanoid robots or other legged robots such as quadrupeds) that are implemented as floating-base humanoid robots (e.g., with no link or attachment to a support) and to control of force-controlled joints of such robots. More particularly, the present description relates to methods for controlling floating-base humanoid robots using human or other motion, which may include motions that are difficult or impossible for the robot to perform, as an input reference motion (or a motion to be performed or copied by the robot) and to robots operating with a controller implementing such control methods.

2. Relevant Background

A biped humanoid robot is a robot with an appearance based on that of the human body. Humanoid robots have been designed for providing interaction with various environments such as tools and machines that were made for humans and often are adapted for safely and effectively interacting with human beings. In general, humanoid robots have a torso with a head, two arms, and two legs each with some form of foot such that the robot can walk on planar surfaces, climb steps, and so on (e.g., these humanoid robots are "bipeds" as are humans). Humanoid robots may be formed with many rigid links that are interconnected by joints that are operated or positioned by applying a force or torque to each joint to move and position a robot. Similarly, other legged robots such as those with three, four, or more legs also may walk utilizing force-controlled movement of their legs. All of these robots may be implemented as floating-base robots (e.g., with no link or attachment to a support)

In order to interact with human environments, humanoid robots require safe and compliant control of the force-controlled joints. In this regard, a controller is provided for each robot that has to be programmed to determine desired motions and output forces (contact forces) and, in response, to output joint torques to effectively control movement and positioning of the humanoid robot. However, it has often proven difficult to achieve desired results with force-controlled robots because while performing a task in a complex environment the robot may encounter uneven ground or steps, static and dynamic obstacles, and even humans. The robot has to continue to be balanced as it stands in one location and also as it steps and moves within the environment. Humanoid robots are expected by many to work with humans in home and office environments. Hence, it would be more desirable for such robots to have human-like motions so that human co-workers can easily infer the robot's intentions and predict future movements for safe and smooth interactions.

To date, it has been difficult to generate human-like motions through optimization or control because no clear criterion is known for coordinating all the joints such that the resulting motions look human-like. For example, many locomotion controllers for humanoid robots are based on simple models that cannot describe their full-body motion. As a result, the motions of the robot usually do not accurately replicate those of a human. In computer graphics, some methods have successfully generated human-like walking and running motions on virtual characters, but it has proven difficult to extend these motions to stylized motions of a humanoid or other floating-base robot.

Since a humanoid robot body is designed to resemble the human body, controlling these robots to mimic human motions seems to be a natural and promising way to endow humanoid robots with human-like movements. However, due to differences in the kinematic and dynamic properties of humans and humanoid robots, a human motion can be infeasible for a robot to perform, and the robot may lose its balance and even fall over trying to replicate a motion that can readily be carried out by a human. This can make it problematic to use human motion as a reference motion for input to a robot controller.

To address the fact that even humanoid robots differ from a human body, human motions are usually modified or adapted to better match a particular floating-base humanoid robot's kinematics and dynamics to maintain balance through the motion. There are a number of issues with this control approach. For example, the modified motion may not satisfy other constraints such as a footstep location in locomotion. As another example issue, the modified motion may no longer appear human-like. Further, it may be undesirable to modify the human motions because these may be a carefully choreographed set of poses that need to be closely duplicated by the robot such as movements in close proximity to other fixed objects or obstacles or other moving objects (e.g., other robots, human actors, and the like), and the modified motion may result in a collision with one or more of these objects.

Hence, there remains a need for a method of controlling floating-base robots, such as humanoid robots, so as to better mimic or copy reference motions, such as human motions, while retaining the robot's balance and, typically, without producing collisions with nearby obstacles in the robot's operating environment. It is preferable that this control method (and robots implementing such a control method) be designed to closely mimic or copy each movement or action within the reference motion in contrast to other techniques that modify the motions to suit the robot.

SUMMARY

The inventors recognized that there was a need for improved methods for controlling floating-base robots including humanoid robots. Particularly, a control method is described herein that adapts human motions (or other input or reference motions) to humanoid robots (or other floating-base robots) based on a technique called "time warping." This method of modifying a reference motion modifies the timeline of a set of poses so as to speed up or slow down one or more motion segments (e.g., delay when a particular infeasible motion segment is performed).

Through the use of time warping, the velocity and acceleration profiles of the motion are changed, and it is possible to turn an infeasible motion into a feasible one. The optimal time warping is obtained through a generalized motion feasibility index that quantifies the feasibility of a motion considering the friction constraint as well as the center-of-pressure (CoP) constraint. Due to the use of the motion feasibility index, the proposed motion adaptation method taught herein can be applied to motions on arbitrary terrains or to varying numbers of links in contact with the environment.

More particularly, a method is provided for controlling movement of a floating-base robot. The method includes receiving as input a set of poses defining motion (or reference motion(s)) for the floating-base robot along a performance timeline. The method also includes determining whether the defined motion is infeasible for the floating-base robot. Then, in response to the determining step, the method includes modifying the set of poses whereby the motion becomes feasible for performance by the floating-base robot and whereby the floating-base robot is moved through each of the poses (e.g., the method does not simply involve changing a pose to provide feasible movements as in prior techniques).

In some preferred embodiments, the modifying step includes changing the time for performing one or more of the poses from a first time to a second time within the performance timeline. The second or new time can be selected such that each of the poses is performed in a sequence provided in the received set of poses (e.g., poses are not reordered). In some cases, the determining whether the motion is infeasible includes calculating a motion feasibility index, which may involve determining whether contact forces satisfying a friction constraint generate a required wrench. In the same or other cases, the second time is selected to provide minimal values of the motion feasibility indices.

BRIEF DESCRIPTION OF THE DRAWINGS

FIGS. 6A and 6B show series of snapshots comparing the original and modified motions of FIG. 5 and comparing the simulated and modified motions of a robot;

DETAILED DESCRIPTION OF THE PREFERRED EMBODIMENTS

Figure 1:
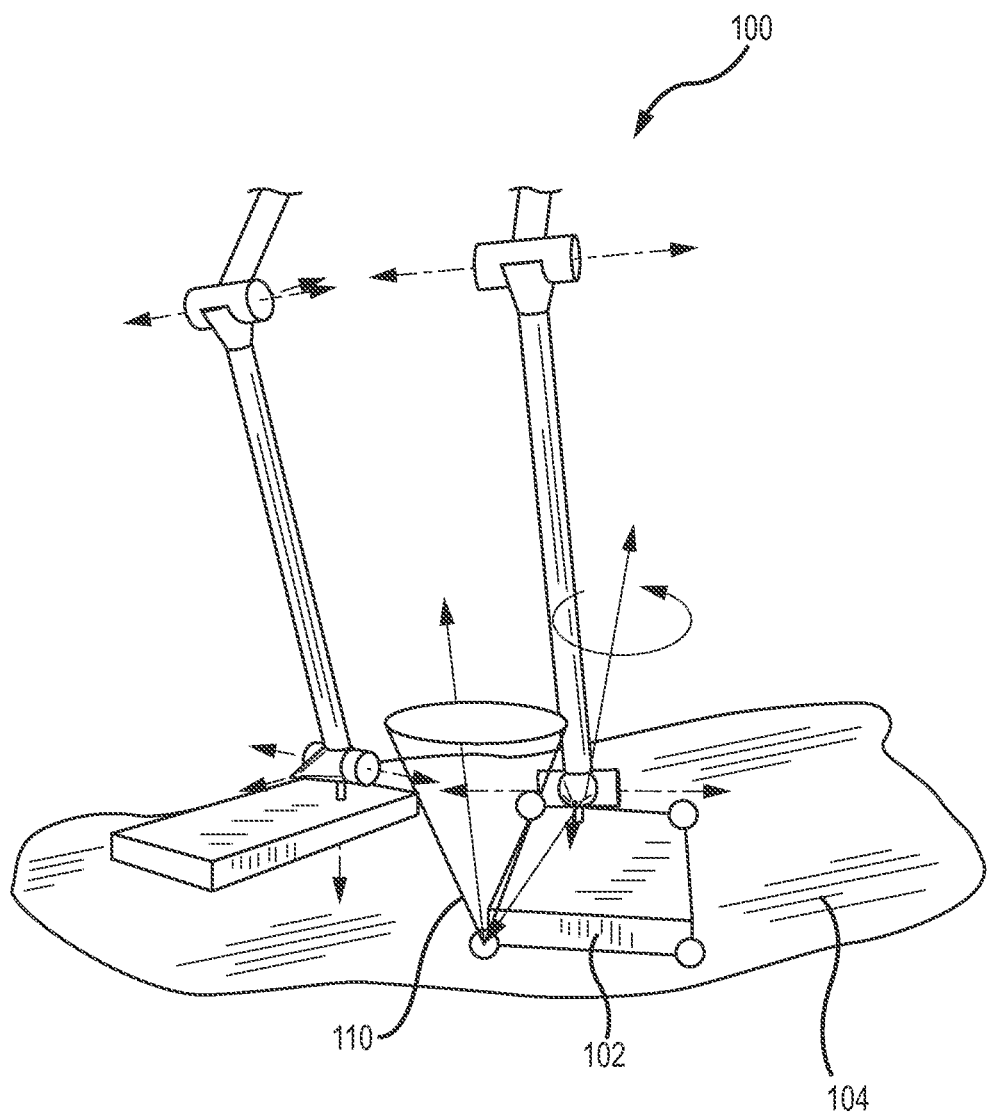
FIG. 1 is a diagram illustrating schematically the relation, for a floating-base humanoid robot, between wrench and contact forces applied to a contact link of the robot by the environment.

Briefly, the present description is directed toward a robot controller, as well as to a control method used to control a robot and a robot with such a controller controlling its balanced movements. The robot controller (or tracking controller) is adapted to allow free-standing or floating-base robots, including humanoid or bi-pedal robots, to track given or input motions or reference motions, such as motions defined by human motion capture data (which may include key frame animation and other sources of human motion data). To this end, the controller implements a control method that determines whether or not the motion is feasible or infeasible at each frame of the reference motion and how far the motion is from being infeasible or feasible. Then, the control method uses time warping techniques to make each motion feasible if infeasible or more feasible if determined to already be feasible. Time warping may involve adjusting the timing of when a movement or action is performed rather than modifying or adapting the movement to the kinematics or dynamics of the robot as in prior control techniques.

Briefly, the inventors recognized that a reference human motion can be adapted to a floating-base humanoid robot (and, likewise, other input or reference motions can be adapted to other non-bipedal robots) by modifying the time line of the reference human motion (i.e., by performing "time warping"). As the label "time warping" for this process implies, the robot is controlled so as to realize the same poses or movements as in the reference motion but at least some of these are realized at different times or moments along the performance timeline. Through control including time warping, the velocity and acceleration profiles of the motion of the floating-base robot are changed, and the reference human motions (or input set of human motions) can be adapted to be (or turned into) feasible motions for the robot (or adapted to be even more feasible if already identified as being feasible).

In some embodiments of the control method, a strictly increasing function was used to ensure that the motions after time warping is complete will not be disordered or prolonged. To this end, the function preserves the period of time of the motion or pose to map the original time line to a new time line. Further, in the described control method, a general motion feasibility index is proposed to guide the choice of a time warping function such that the modified motion has a relatively larger feasibility margin for the robot being controlled using the motions modified by time warping. Due to the generality of the motion feasibility index, the proposed motion adaptation method (or control method) can be applied to motions on arbitrary terrains or in varying contact situations for the robot.

The following description provides further discussion of related work and then discusses the dynamics of a humanoid robot (as one example of a floating-base robot that can be controlled with the present control method). The description then proceeds to explain in detail the motion feasibility index followed by the motion adaptation through time warping. The description further provides a discussion of exemplary simulation results achieved using the control method.

As humanoid robots and humans have similar structures, programming humanoid robots by referring to human motions or poses seems to be an effective way to let robots have natural, human-like movements. Many efforts have been made to this end including use of control methods that calculate the joint angles of a robot to fit a human motion based purely on the kinematics of the robot. Other methods parameterize the joint trajectory of the robot and formulate an optimization problem to determine the values of the parameters, respecting the fitting to the reference trajectory as well as the robot's own dynamics and physical limitations. Many control methods involve modifying the joint trajectory that is extracted from a human motion according to a replanned zero moment point (ZMP) or center of mass (CoM) trajectory, which is generated based on a simple model of the robot and which ensures the equilibrium of the robot in the motion. Still other techniques realize online motion tracking incorporated with balance control.

None of these control techniques have proven wholly satisfying in their ability to control movements of a humanoid robot to accurately mimic human motions (or reference motions taken as input to the control method). Particularly, all the aforementioned methods include steps that modify the pose of the robot in a reference motion to make the motion feasible for the robot. In contrast and in fact as discovered by the inventors, the velocity and acceleration profiles of a reference motion (e.g., a human movement from motion capture or the like) can be changed without changing any poses by scaling or warping the time line of the set of poses (or sometimes called "time warping" the motion). In this manner, it is possible to obtain a feasible motion in which the robot will realize the same pose as specified in the original reference motion.

In order to adapt human motions to humanoid robots, it is desirable to provide a criterion for quantifying motion feasibility. One of the most widely used criterion has been the Zero-Moment Point (ZMP) that represents the center of the ground reaction force required to perform a given motion. Using this criterion, a motion is considered feasible if the ZMP is always within the contact convex hull. Other researchers used the ZMP criterion to determine the time progress to generate collision-free and dynamically feasible motions. Some have also proposed a foot rotation indicator (FRI) that indicates the center of ground reaction force required to keep the foot stationary. The inventors recognized that none of these techniques consider the friction constraint at contact and also assume that all contacts occur on a flat surface. In this description, a general motion feasibility index is taught that, in contrast to these prior techniques, considers friction constraints, allows complex contact conditions (rather than assuming a flat surface), and applies the general motion feasibility index to human motion adaptation (and control of a robot with an adapted reference motion).

To facilitate better understanding of the control issues, it may be useful to next review the dynamics and motion tracking involved with controlling a humanoid robot (an exemplary floating-base robot with the concepts then being applicable to other floating-base robots including non-bipedal robots). First, with regard to an equation of motion, one may consider a humanoid robot with $N_J$ actuated joints and $N_G = N_J + 6$ degrees of freedom (DoF) including six unactuated DoF of the floating base. Then, $q \in \mathbb{R}^{N_G}$ can be used to denote the generalized coordinates that define the configuration of the robot, and the first six components of q correspond to the translation and rotation of the floating base of the robot. Next, $N_C$ can be the number of links in the contact with the environment with $w_i \in \mathbb{R}^6$ (i=1, 2, ..., $N_C$) being the contact wrench (i.e., force and moment) applied to contact link i by the environment.

The equation of motion of the robot can then be written as:

$$M\ddot{q} + c = N^T \tau + J^T w \qquad \text{Eq. (1)}$$

where $M \in \mathbb{R}^{N_G \times N_G}$ is the joint-space inertia matrix of the robot, $c \in \mathbb{R}^{N_G}$ is the sum of Corioli, centrifugal, and gravity forces, and $w = [w_1^T w_2^T \ldots w_{N_C}^T]^T \in \mathbb{R}^{6N_C}$. Matrix $N \in \mathbb{R}^{N_J \times N_G}$ maps the joint torques into the generalized forces. Since the floating base is unactuated, the first six rows of $N^T$ are zero and N has the form:

$$N = [0_{N_J \times 6} I_{N_J \times N_J}] \qquad \text{Eq. (2)}$$

Matrix $J \in \mathbb{R}^{6N_C \times N_G}$ is the contact Jacobian. Its transpose maps the contact wrenches into the generalized forces and has the form:

$$J = [J_1^T J_2^T \ldots J_{N_C}^T]^T \qquad \text{Eq. (3)}$$

where $J_i \in \mathbb{R}^{6 \times N_G}$ is the Jacobian of contact link i with respect to the generalized coordinates.

One can then let $p_{i,j} \in \mathbb{R}^3$ (j=1, 2, ... $N_i$) be the vertices of the contact area between contact link i and the environment and further let $f_{i,j} \in \mathbb{R}^3$ be the contact force at vertex j on contact link i. FIG. 1 illustrates a schematic of lower portion of a floating-base humanoid robot 100 with a graph 110 showing this relation between the wrench and the contact forces applied to a contact link 102 by the environment 104. The number Ni of contact vertices for every contact link can be 0, 1, 2, and 3 or more in the cases of no contact, point contact, edge contact, and face contact, respectively. In this discussion, it is assumed that all the contacts are rigid subject to the Coulomb friction model. Therefore, $f_{i,j}$ is a pure force and can be decomposed into three components $f_{i,j1}$, $f_{i,j2}$, $f_{i,j3}$ along the normal and two tangential vectors at the contact vertex. It should satisfy the friction constraint as shown below to avoid undesired slippage at the contact link:

$$F_{i,j} = \{f_{i,j} \in \mathbb{R}^3 | f_{i,j1} \geq 0, \sqrt{f_{i,j2}^2 + f_{i,j3}^2} \leq \mu_i f_{i,j1}\} \qquad \text{Eq. (4)}$$

The wrench $w_i$ applied to contact link i is the resultant force and moment from all contact forces $f_{i,j}$ (j=1, 2, ... $N_i$) and can be written as:

$$w_i = \sum_{j=1}^{N_i} R_{i,j} f_{i,j} = R_i f_i \qquad \text{Eq. (5)}$$

where $R_i = [R_{i,1} R_{i,2} \ldots R_{i,N_i}] \in \mathbb{R}^{6 \times 3N_i}$, $f_i = [f_{i,1}^T f_{i,2}^T \ldots f_{i,N_i}^T]^T \in \mathbb{R}^{3N_i}$, and $R_{i,j} \in \mathbb{R}^{6 \times 3}$ is the matrix that maps $f_{i,j}$ into the force and movement around the local frame of contact link i in which $w_i$ is expressed.

Now, with regard to inverse dynamics, right joint torques are determined for actuating the robot in order for the humanoid robot to realize a reference human motion. To this end, the desired joint accelerations are first calculated based on the reference accelerations as well as the reference and current positions and velocity of the joints:

$$\ddot{q} = \ddot{q}^{ref} + k_d(\dot{q}^{ref} - \dot{q}) + k_p(q^{ref} - q) \qquad \text{Eq. (6)}$$

where q, $\dot{q}$ are the current joint angle and velocity, $q^{ref}$, $\dot{q}^{ref}$, $\ddot{q}^{ref}$ are the reference joint angle, velocity, and acceleration, and $k_p$, $k_d$ are proportional and derivative gains.

Once the desired joint accelerations are determined, joint torques and corresponding contact forces are computed based on Equations (1) and (5) subject to the friction constraint provided by Equation (4). This problem is often known as inverse dynamics and can be reduced to a quadratic programming problem as will be readily understood by those skilled in the field of robots and robot control.

It is common that a reference motion is not always feasible for a particular robot. In other words, there may not exist feasible contact forces under the friction constraint to support the robot and enable the robot to realize the desired joint accelerations. In this case, the reference motion will not be exactly reproduced by the robot, and what motion the robot does generate depends on the properties of the motion tracking controller and the extent of infeasibility of the reference motion. In some cases, a similar motion may be generated by the robot, but an unexpected motion may also occur and cause the robot to lose balance and fall over or to have a collision. Therefore, it is desirable to modify the reference motion for use in controlling a floating-base robot such as a bipedal humanoid robot so as to make the motion feasible for the robot to perform. To this end, the following discussion first introduces a quantitative motion feasibility index and second teaches a motion adaptation method based on the motion feasibility index.

The control method described herein involves first determining a general quantitative index of motion feasibility, e.g., for each frame or motion (pose) in a reference motion as may be provided by motion capture of a human or the like. The index provides an indication of whether or not a given motion is feasible for a particular floating-base robot (e.g., a bipedal humanoid robot, a floating-base with three, four, or more legs, or other robot configuration), and the index also quantifies how far the motion is from being feasible (if determined to be infeasible) or infeasible (if determined to be feasible).

Regarding definitions, the first six equations in the full-body dynamics equation (i.e., Equation 1) describe the motion of the floating base. Hence, these equations do not involve joint torques, which corresponds to the fact that the total linear and angular moments are affected only by external forces. Extracting these first six equations of Equation 1 yields:

$$M_1\ddot{q}+c_1=J_1^T w \qquad \text{Eq. (7)}$$

where $M_1 \in \mathbb{R}^{6 \times N_G}$ and $J_1^T \in \mathbb{R}^{6 \times 6N_C}$ consist of the first six rows of M and $J^T$, respectively, and $c_1$ comprises the first six components of c. Then, substituting Eq. (5) into Eq. (7) yields:

$$M_1\ddot{q}+c_1=Gf \qquad \text{Eq. (8)}$$

where $f=[f_1^T\ f_2^T\ \ldots\ f_{N_C}^T]^T \in \mathbb{R}^{3N_f}$ consists of the contact forces applied to all contact links and is called the total contact force, $G=[G_1\ G_2\ \ldots\ G_{N_C}] \in \mathbb{R}^{6 \times 3N_f}$. $G_i=J_{1i}^T R_i \in \mathbb{R}^{6 \times 3N_i}$ maps all contact forces to the wrench around the floating base and is called the total contact mapping, and $N_f=\Sigma_{i=1}^{N_C} N_i$ is the number of contact forces/points over all contact links.

Given a reference motion for the robot, the left hand side of Eq. (8) can be calculated, and it is the required wrench at the floating base for the robot to realize the reference motion. The right hand side of Eq. (8) is the wrench that can be generated on the floating base by contact forces. Matrix G can be calculated based on the state and the position of every contact link specified in the reference motion. Then, whether the reference motion is feasible for the robot is equivalent to whether there are feasible contact forces $f$, namely contact forces satisfying the friction constraint given in Eq. (4) to generate the required wrench and make Eq. (8) hold.

To define the motion feasibility index, one can look closely at the geometric property of Eq. (8). The left side of Eq. (8) is a single point w in the 6-D wrench space. The friction constraint given by Eq. (4) defines a convex cone that restricts the contact force at every contact point, as depicted in FIG. 1. Through the linear mapping G, the image of the convex cones from all contact points is a convex cone V with apex at the origin in the 6-D wrench space, which consists of all wrenches that can be generated on the floating base with feasible contact forces. Then, the reference motion is feasible for the robot if, and only if, the single point w is contained in the convex cone V. If $w \notin V$ or the motion is infeasible, the minimum distance $d^+$ from w to V, defined as below, can be used to measure how far the motion is from being feasible:

$$d^+ \triangleq \min_{v \in V}\|w-v\| \qquad \text{Eq. (9)}$$

where $\|\cdot\|$ denotes the Euclidean norm. If $w \in V$ or the motion is feasible, we use the minimum distance $d^-$ from w to the boundary of V to measure how far the motion is from becoming infeasible:

$$d^- \triangleq \min_{v \in \partial V}\|w-v\| \qquad \text{Eq. (10)}$$

where $\partial V$ denotes the boundary of V. Finally, the motion feasibility index is defined as:

$$d \triangleq \begin{cases} d^+ & w \notin V \\ -d^- & w \in V \end{cases} \qquad \text{Eq. (11)}$$

Note, d is positive for an infeasible motion and non-positive (or negative) for a feasible motion in these calculations.

At this point, it may be useful to discuss computation of the motion feasibility index and, particularly, to discuss the algorithms that can be used to compute $d^+$ and $d^-$. First, it can be assumed that the reference motion is infeasible and to proceed to calculate $d^+$. If $d^+=0$, which implies that $w \in V$ and the reference motion is feasible, then the calculation of $d^-$ can continue. In the following discussion, $V_k$ is used to denote a finite set of vectors in V and CO ($V_k$) the convex cone with apex at the origin formed by vectors in $V_k$ as its edges.

With regard to computation of $d^+$, the value of $d^+$ can be calculated by an algorithm (such as that taught in Y. Zheng and C. M. Chew, "Distance between a point and a convex cone in n-dimensional space: computation and applications," *IEEE Transactions on Robotics*, Vol. 25, No. 6, pp. 1397-1412, 2009) that iteratively changes a simplicial cone in V such that its minimum distance from the point w converges to $d^+$, as illustrated with the graph 210 in FIG. 2A.

The algorithm may start with any linearly independent set $V_k$ of vectors V and iterates as follows with the assumption that w is not contained in CO($V_k$). Let $d_k$ be the minimum distance from w to CO ($V_k$) and $v_k$ the point on CO ($V_k$) closest to w, which can be calculated simply by projecting w onto every face of CO($V_k$). Let $\hat{V}_k$ be the minimal subset of $V_k$ forming the face of the lowest dimension of $CO(V_k)$ that contains the point $v_k$. If $v_k \neq w$, then the hyperplane with normal $w-v_k$ passing through $v_k$ bounds $CO(V_k)$ to one side and cuts the convex cone V, which allows us to find a vector on the boundary of V that falls on the other side of the hyperplane. Adding the vector to $\hat{V}_k$, $V_{k+1}$ is obtained, and it can be shown that the minimum distance $d_{k+1}$ from w to $CO(V_k)$ is strictly smaller than $d_k$. Therefore, $d_k$ is strictly decreasing along with the iteration and guaranteed to converge to $d^+$, which is the greatest lower bound on $d_k$. If $w \notin V$ or the reference motion is infeasible, then $d^+>0$, and the computing of the motion feasibility index d stops. Otherwise, $d^+=0$, and the algorithm continues with continuing the computation of $d^-$.

With regard to computation of $d^-$, if $w \in V$ (i.e., the reference motion is feasible), the algorithm yields a finite set $V_k$ of vectors in V such that w is contained in the polyhedral cone $CO(V_k)$. Starting with such a set, which is rewritten as $V_0$ here, an algorithm can be presented to compute $d^-$ by iteratively adding vectors to $V_k$ and expanding $CO(V_k)$ such that the minimum distance from w to the boundary of CO $(V_k)$ converges to $d^-$, as illustrated in the graph 220 of FIG. 2B. Assume that $V_0$ contains six linearly independent vectors such that the formed polyhedral cone is 6-D in the 6-D wrench space. Let $V_{k,j}(j=1, 2, \ldots, N_k)$ be a subset of five linearly independent vectors in $V_k$ that form a facet of CO $(V_k)$. Let $v_{k,j}$ be the orthogonal projection of w on the subspace spanned by $V_{k,j}$ and $d_{k,j}$ the distance between w and $v_{k,j}$, which gives the distance from w to the facet formed by $V_{k,j}$. Let $j_k = \arg\min_{j=1, 2 \ldots N_k} d_{k,j}$, $d_k = d_{k,j_k}$ and $vk = v_{k,j_k}$. Then, it can be proved that $d_k$, as the minimum distance from w to all the facets of CO $(V_k)$, is the minimum distance from w to the boundary of CO $(V_k)$. The hyperplane with normal $v_k-w$ passing through $v_k$ bounds CO $(V_k)$ to one side. If the hyperplane cuts the convex cone V, then we can find a vector on the boundary of V that is on the other side of the hyperplane. Adding such a vector to $V_k$ yields $V_{k+i}$, which forms a bigger polyhedral cone CO $(V_{k+1})$ that contains facet $j_k$ of CO $(V_k)$ in its interior. Then, by the iteration, CO $(V_k)$ keeps expanding and $d_k$ is increasing. On the other hand, $d^-$ is the least upper bound on $d_k$, since CO $(V_k)$ is always contained in V. Therefore, $d_k$ converges to $d^-$ as the algorithm iterates.

Figure 2A:
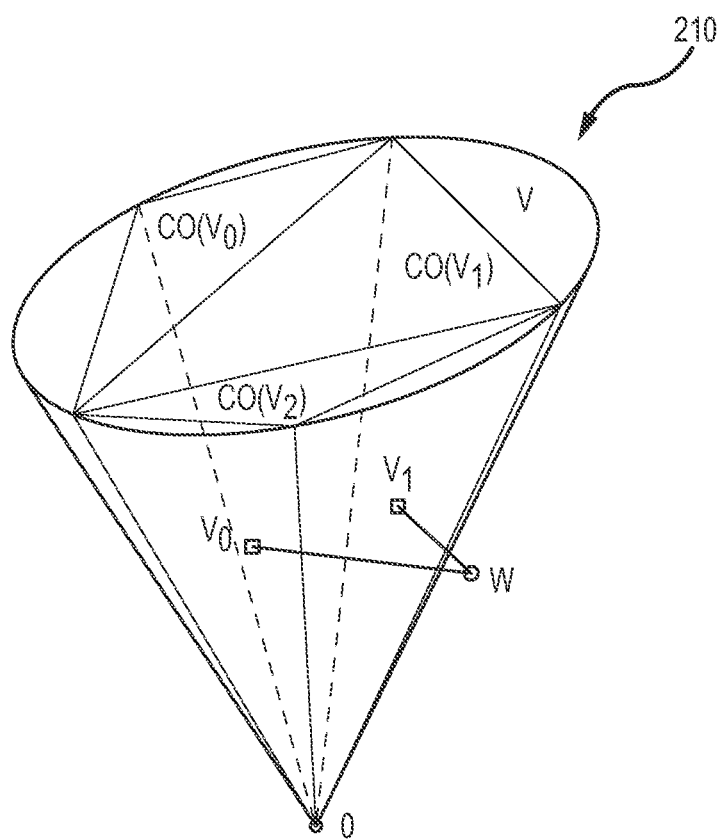
FIGS. 2A and 2B illustrate graphically a motion feasibility index for an infeasible motion and for a feasible motion, respectively, and their computation.
Figure 2B:
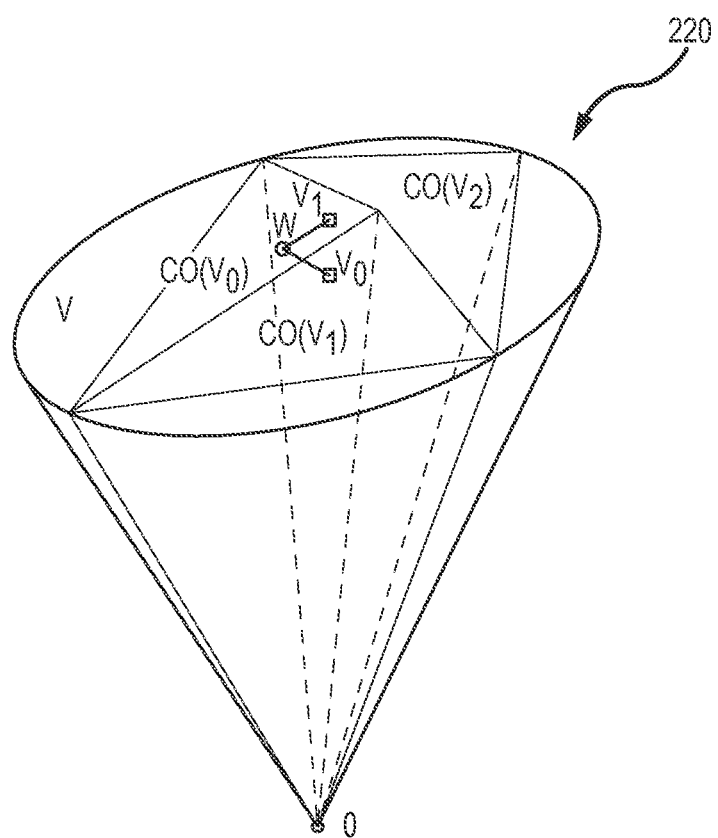

In review with reference to FIGS. 2A and 2B, computing $d^+$ uses a simplicial cone CO $(V_k)$ that is in the convex cone V that is changed iteratively such that its minimum distance from the point w converges to the minimum distance $d^+$ from w to V. Computing $d^-$ uses a polyhedral cone CO $(V_k)$ in the convex cone V that is expanded iteratively such that the minimum distance from the point w to its boundary converges to the minimum distance from w to the boundary of V.

Once the reference motion is identified as feasible or infeasible (with the magnitude or distance also identified), the motions can be made feasible if infeasible and more feasible if already identified as feasible by the above-described algorithm. To this end, the control method may utilize a method labeled as "time warping," which is a method for adapting a reference human motion (or other input reference motion) to a humanoid robot (or other floating-base robot) based on the calculated or determined motion feasibility index. Unlike most methods that change the pose of the robot in the particular motion, the adapting method taught herein warps the time line of the motion and is called warping or time warping. In this manner, the robot is controlled to realize the same pose as in the reference motion (e.g., in a frame of a motion capture input), which may be particularly important or useful for some locomotion tasks that do not allow the robot to deviate from the desired motion (e.g., motion involving following a preplanned footstep sequence, motion that follows a collision-free trajectory to move or walk over a rough terrain or through obstacles, or the like).

Figure 3A:
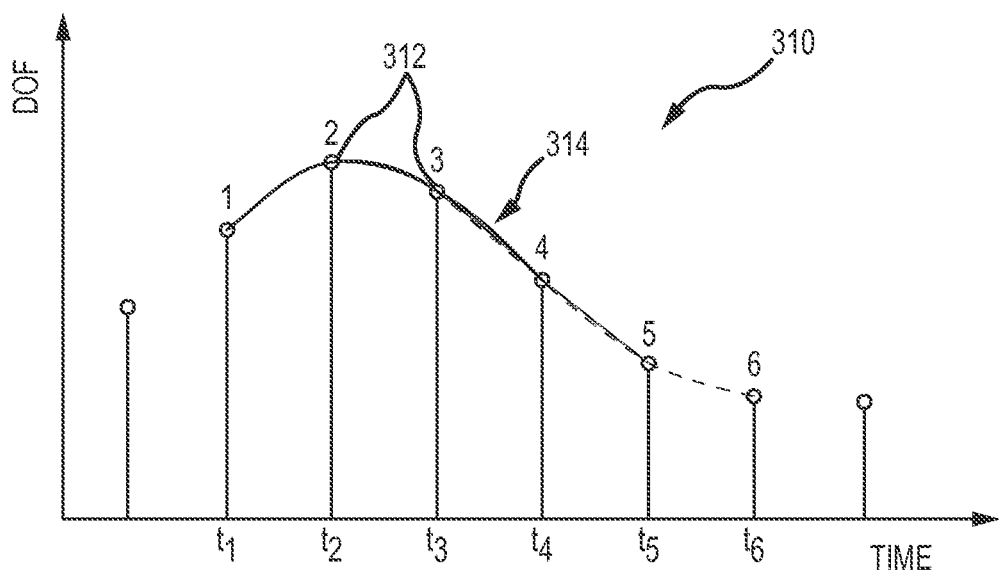
FIGS. 3A and 3B illustrate graphically the determination of a motion trajectory from an input reference motion (e.g., one obtained from motion capturing of human movements over time) and the adapting of this trajectory using time warping of several of the motions defined in the input reference motion (e.g., performing same poses or motions but at different times)

To better understand how time warping works in this control method, it may be useful to first introduce the constitution of a reference motion. A reference motion may mainly be made up of key motion frames for every DoF of the robot including the floating base and joints. It also contains the time of contact state change for every contact link. The time interval between two frames (e.g., one-thirtieth of a second or the like) is usually much longer than the control cycle of the controller (e.g., 1 or 2 milliseconds or the like). Then, the trajectory between two frames is determined through interpolation, as shown with the graph 310 in FIG. 3A showing poses or motions with numbers performed in consecutive time frames (or at times along the timeline provided on the x-axis with the DoF shown along the y-axis), which involves not only the two frames but also several adjacent frames depending on the particular interpolation method used within the control method using time warping. In the graph 310 processing of a reference motion is shown including interpolation of key frames (e.g., black dots 312). To interpolate the motion trajectory provided by line 314 in graph 310 between frames 2 and 3 (or frames 3 and 4 or frames 4 and 5 and so on), frames 1 to 4 (or 2 to 5 or 3 to 6) are used in this example.

Figure 3B:
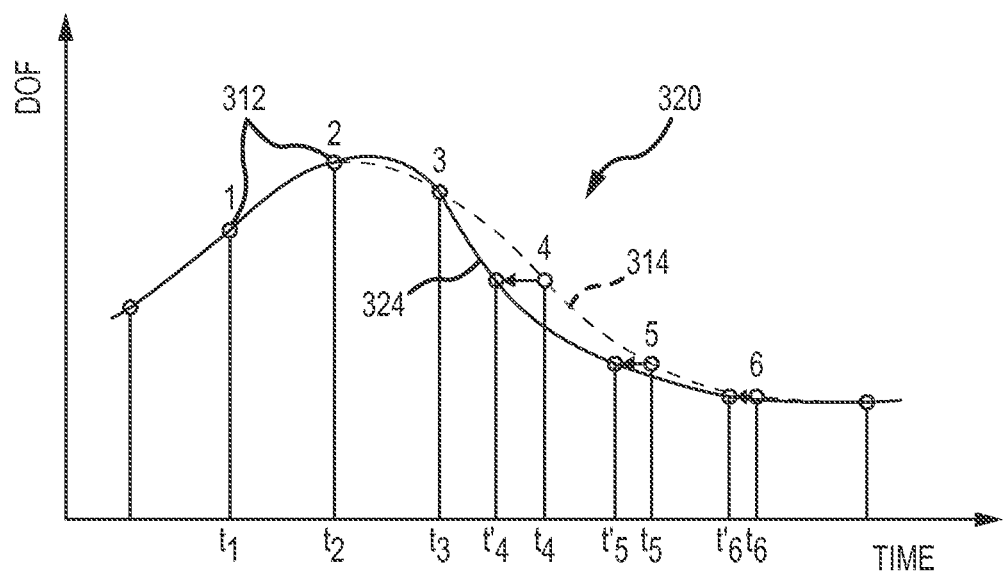

FIG. 3B illustrates with graph 320 the principle of time warping as applied to the interpolated trajectory or reference motion of graph 310 in FIG. 3A. Time warping involves the altering of the times of the motion frames (or poses in the reference motion) shown by dots 312 in FIG. 3A. This means that the robot controlled using the modified trajectory or time-warped motion shown by line 324 by interpolating between dots 312 (same number of dots is used to show that the same motion or pose is performed as defined in the input/reference motion but at a differing time) will realize the same pose specified by a motion frame (e.g., dots 312) but at a different time as shown along the new time line on the x-axis of graph 320. Then, the motion trajectory over time (shown with line 324) will be changed when compared with the motion trajectory 314 of the input/reference motion. By doing this "time warping," an infeasible reference motion can be turned into a feasible one for a particular controlled robot (e.g., the infeasible motions/poses in the reference motion may be the ones having their timing altered). In the graph 320, time warping is performed of time frames 4-6 (or the motions/poses therein), which may have been identified as infeasible (or feasible but a relatively small distance from becoming infeasible) by determining the motion feasibility index for these motions as explained earlier. As shown, the motion trajectory 324 is changed relative to original trajectory 314 since time frame 2 (or the motion defined therein).

With regard to canonical time warping functions, a canonical time warping function can first be defined as $t'=f_0$ (t): $t \in [0,1] \to t' \in [0,1]$ with the following properties: (a) $f_0$ (0)=0; (b) $f_0$ (1)=1; and (c) $f_0$ is strictly increasing in [0,1]. The first two properties ensure that the time warping function does not increase or decrease the motion period. The third property ensures that time warping does not change the order of the input/reference motion frames over time. Then, a canonical time warping function can be written as a combination of a set of basis functions as:

$$f_0(t) = \sum_{k=1}^{K} c_k f_k(t) \qquad \text{Eq. (12)}$$

where $f_k(t)$'s are user-specified basis functions and $c_k$'s are unknown coefficients that need to be determined. From Equation (12) with properties (a) and (b), one can obtain:

$$\begin{bmatrix} f_1(0) f_2(0) & \cdots & f_K(0) \\ f_1(1) f_2(1) & \cdots & f_K(1) \end{bmatrix} c = \begin{bmatrix} 0 \\ 1 \end{bmatrix} \qquad \text{Eq. (13)}$$

where $c=[c_1 \; c_2 \; \ldots \; c_K]^T$. Then, c can be written as:

$$c = c_0 + N \lambda \qquad \text{Eq. (14)}$$

where $c_0$ is a particular solution and $N \lambda$ is the homogeneous solution to Equation (13).

Property (c) is equivalent to the condition $f_0'(t) > 0$ for $\forall t \in [0,1]$, where $f_0'(t)$ denotes the derivative of $f_0(t)$. This condition can be approximated by taking a finite number of sample points $t_l$ ($l=1, 2, \ldots L$) in $[0,1]$ and rewriting the condition as:

$$Ac > 0 \qquad \text{Eq. (15)}$$

where $$A = \begin{bmatrix} f_1'(t_1) & f_2'(t_1) & \cdots & f_K'(t_1) \\ f_1'(t_2) & f_2'(t_2) & \cdots & f_K'(t_2) \\ \vdots & \vdots & \ddots & \vdots \\ f_1'(t_L) & f_2'(t_L) & \cdots & f_K'(t_L) \end{bmatrix}$$

Substituting Equation (14) into Equation (15) yields:

$$AN\lambda > -Ac_0 \qquad \text{Eq. (16)}$$

Equation (16) defines a convex feasible region for $\lambda$. By sampling the feasible region and substituting obtained feasible $\lambda$'s into Equation (14), valid canonical time warping functions are derived that possess all three properties defined above for a chosen set of basis functions.

Figure 4A:
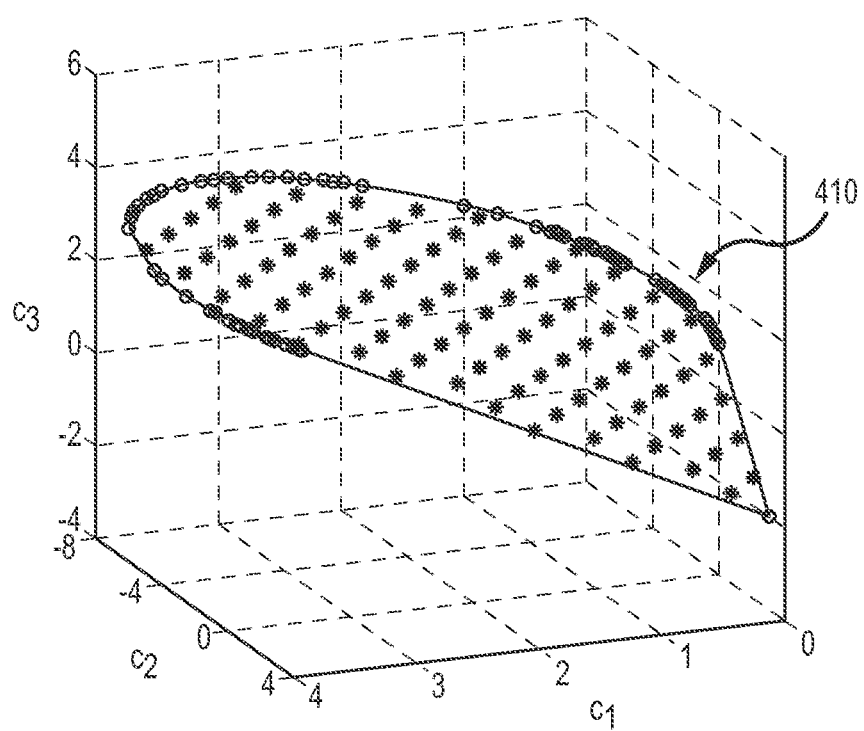
FIGS. 4A and 4B are graphical illustrations of a case of valid canonical time warping functions based on a cubic function.
Figure 4B:
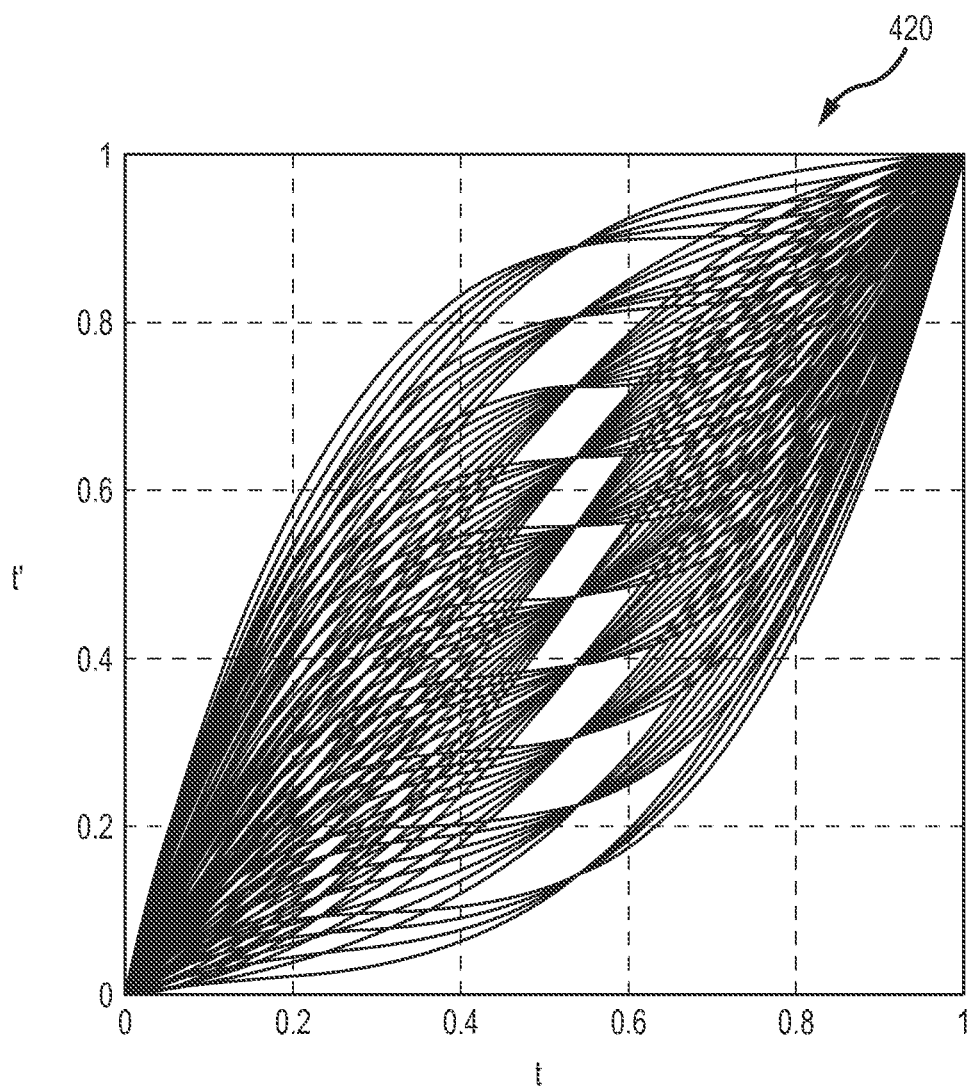

FIGS. 4A and 4B illustrate with graphs 410 and 420 the case of valid canonical time warping functions based on the cubic function. Particularly, FIGS. 4A and 4B provide an example of the canonical time warping function: $f_0(t) = c_1 t + c_2 t^2 + c_3 t^3$. In the graph 410 of FIG. 4A, a feasible region is outlined and samples (shown with asterisks) are provided of coefficients such that $f_0(t)$ is strictly increasing in $[0, 1]$. In the graph 420 of FIG. 4B, plots are provided of corresponding valid canonical time warping functions.

Optimization for the time warping function may be performed in a variety of ways to practice the present control method such as sampling or use of another useful numerical optimization technique. It can be assumed that a reference motion is infeasible between time $t_s$ and $t_e$ ($t_e > t_s$) and that a time warping function is used to modify this segment of the motion trajectory. Based on a valid canonical time warping function $f_0(t)$, the time warping function $f(t)$ for the segment between $t_s$ and $t_e$ as:

$$f(t) = f_0\left(\frac{t-t_s}{t_e-t_s}\right)(t_e - t_s) + t_s \qquad \text{Eq. (17)}$$

Through the use or application of the three properties of $f_0(t)$ given in the previous discussion, $f(t)$ possesses the following properties: (a) $f(t_s) = t_s$; (b) $f(t_e) = t_e$; and (c) $f(t)$ is strickly increasing in $[t_s, t_e]$.

After choosing the time warping function $f(t)$, the feasibility of the modified function can be verified between time $t_s - \Delta t$ and $t_e + \Delta t$, where $\Delta t > 0$. It should be noted that even though the time warping function changes only the times of motion frames between $t_s$ and $t_e$, the velocity and acceleration of the motion before $t_s$ and after $t_e$ may also be changed because the motion frames between $t_s$ and $t_e$ are also used in the interpolation to determine the motion trajectory before $t_s$ and after $t_e$, as illustrated in FIGS. 3A and 3B. The time $\Delta t$ depends on how many motion frames are used in interpolation, which determines how long of a time period of the motion before $t_s$ or after $t_e$ will be affected by changing the times of motion frames between $t_s$ and $t_e$.

For a chosen set of basis functions, there may be many valid canonical time warping functions, as shown in FIG. 4B, that provide multiple choices of the time warping function for use in modifying or adapting an infeasible motion segment (or a feasible motion segment for which it is desirable to make it "more" feasible). Among all the time warping functions it may be useful to seek the one such that the value of the motion feasibility index given above is minimized or at least relatively small in magnitude. When the minimum value is non-positive, the modified motion is or becomes feasible. Otherwise (i.e., if the minimum value is positive, which indicates the motion is infeasible even after modification by a time warping function), one or more different basis function may be used for performing the time warping to modify the segment or subset of the reference motion.

At this point in the discussion, it may be useful to discuss simulation results obtained by the inventors through the use of the control method techniques described herein (e.g., determining motion feasibility index values, using these values to select one or more motions to modify with time warping, applying time warping to the reference motion to achieve a wholly feasible motion, and controlling a robot using the modified motion). Particularly, the inventors performed tests to verify the effectiveness of the proposed control method through simulation with different motions of a floating-base humanoid robot, and, in this regard, a dynamics simulator with a rigid-contact model developed by the University of Tokyo was used in the tests or experiments. The humanoid robot model used in the simulations had twenty-five joints (seven in each leg, four in each arm, and three in the torso) and thirty-one DoF including the translation and rotation in the floating base. A motion tracking controller as taught in U.S. patent application Ser. No. 14/067,603, filed Oct. 30, 2013, which is incorporated herein in its entirety, was used for the robot to reproduce the reference motion and the motion after modification with time warping.

Figure 5:
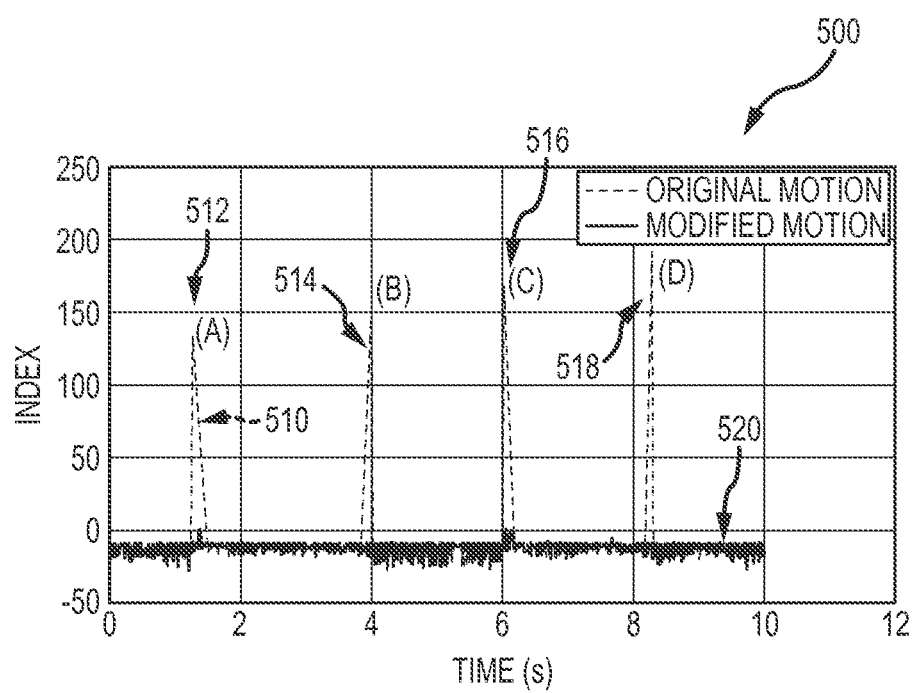
FIG. 5 is a graph with plots of the value of the calculated motion feasibility index first for an input reference motion with infeasible motions and second for a motion after modification with time warping to only include feasible motions for a floating-base humanoid robot.

A first set of experiments were performed using a side stepping motion to demonstrate the time warping-based control method. The graph 500 of FIG. 5 plots the value of the calculated motion feasibility index with line 510 for an input reference motion (having infeasible motions at 512, 514, 516, and 518) and with line 520 for the motion after modification with time warping without changing poses (having the motions 512, 514, 516, 518 performed at differing times to provide only feasible motions). The original motion 510 becomes infeasible (index being positive), in this case, when the right foot of the robot (as shown at 512) starts to lift off or (as shown at 514) when the right foot is about to touch down. Further, the motion 510 becomes infeasible when the left foot (as shown at 516) starts to lift off or (as shown at 518) is about touch down. By time warping, the modified motion 520 is completely feasible for the robot (i.e., index as shown with the y-axis being negative all the time or along the entire movement timeline provided by the x-axis of graph 500).

It can be seen that the index is positive at some moments of the reference motion represented with spikes at 512, 514, 516, 518 of dashed line 510, which implies that the motions of these time frames is not entirely feasible for the robot. In this experiment with the control method, the time warping function that is applied to each infeasible motion or motion segment of the reference motion (such as motions 512, 514, 516, 518 of motion 510) was a cubic function. Then, the index for the modified motion as shown with line 520 becomes all negative, which implies that the motion becomes feasible after time warping.

Figure 6A:
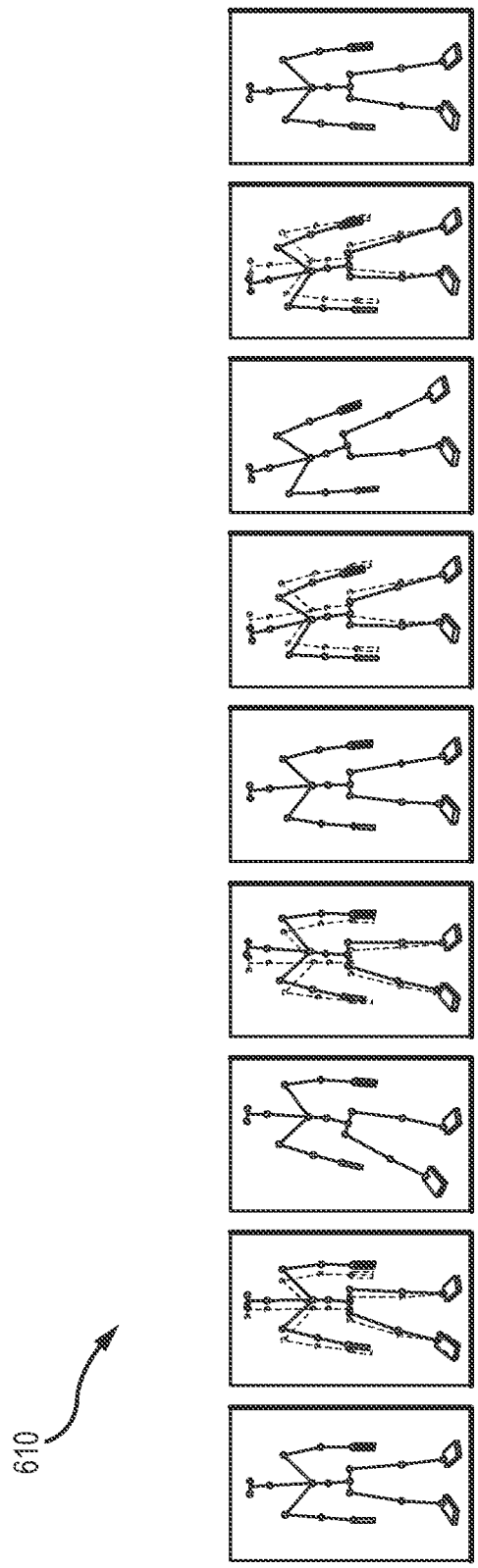

FIG. 6A shows a series 610 of snapshots comparing the original and modified motions of FIG. 5, with the solid robot representing the modified motion and the transparent/dashed robot representing the original or reference motion. It can be observed that time warping accelerates the robot's body motion towards one supporting foot side while the other foot is about to lift off. This ensures that the weight of the robot can be supported by only one foot after the other foot lifts off and the robot will not lose balance. Similarly, while the liftoff foot is about to touch down, the robot's body motion is slowed down, which wins the time for the liftoff foot to touch down. FIG. 6B shows a series 620 of snapshots of the simulated reference (shown with the solid robot) when the robot tries to reproduce the time warp-modified motion (shown with the transparent/dashed robot). It can be seen that there is no significant difference between the two motions, and the robot is able to reproduce the modified stepping motion well (all motions are feasible).

Figure 7:
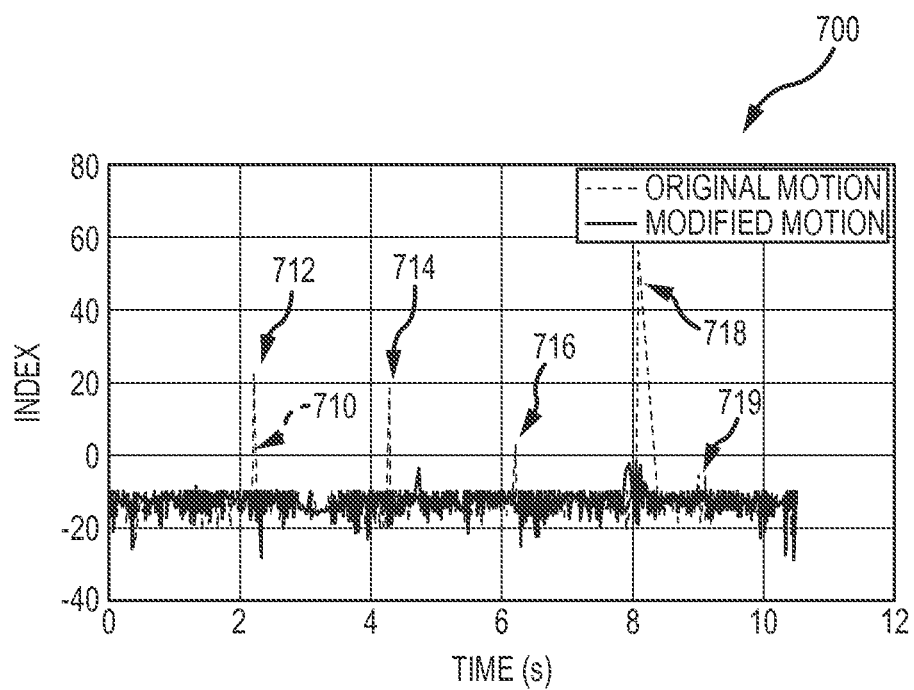
FIG. 7 is a graph with plots of the value of the calculated motion feasibility index first for an input reference motion associated with climbing up stairs having infeasible motions for a robot and second for a motion of climbing the same stairs after modification with time warping.

A second set of experiments were performed using a reference motion of walking up a set of stairs. Due to the use of the general motion feasibility index, the proposed motion adaptation method with time warping can be applied to motions on any terrain. Particularly, the robot can mimic a human walking upstairs, where each stair is about 0.083 meters high. FIG. 7 plots the value of the calculated motion feasibility index with line 710 for an input reference motion (having infeasible motions at 712, 714, 716, 718, 719) and with line 720 for the motion after modification with time warping without changing poses (having the motions 712, 714, 716, 718, 719 performed at differing times to provide only feasible motions). FIG. 7 shows with graph 700 the values of the motion feasibility index for the original and modified motions with lines 710 and 720, respectively. Cubic functions were selected as the time warping functions, which successfully turned all the infeasible motions or motion segments 712, 714, 716, 718, and 719 into feasible ones.

Figure 8A:
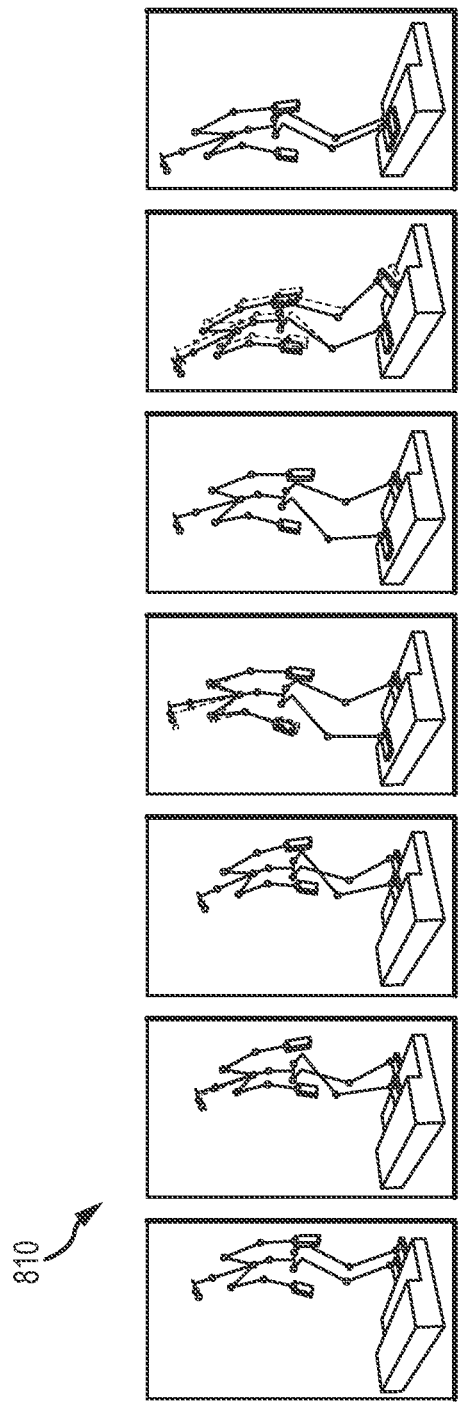
FIGS. 8A and 8B show series of snapshots comparing the original and modified motions of FIG. 7 and comparing the simulated and modified motions of a robot.
Figure 8B:
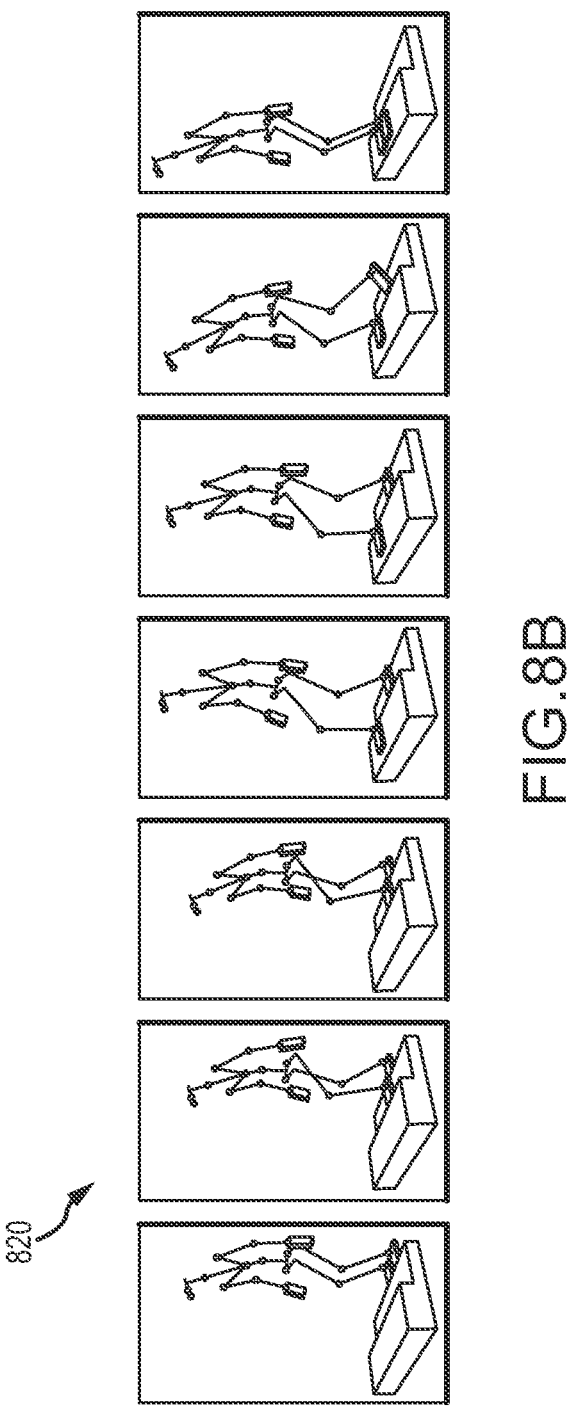

FIG. 8A shows a series 810 of snapshots comparing the original and modified motions of FIG. 7, with the solid robot representing the modified motion and the transparent/dashed robot representing the original or reference motion. FIG. 8B shows a series 820 of snapshots of the simulated reference (shown with the solid robot) when the robot tries to reproduce the time warp-modified motion (shown with the transparent/dashed robot). It can be seen that there is no significant difference between the two motions, and the robot is able to reproduce the modified stair climbing motion well (all motions are feasible).

Figure 9:
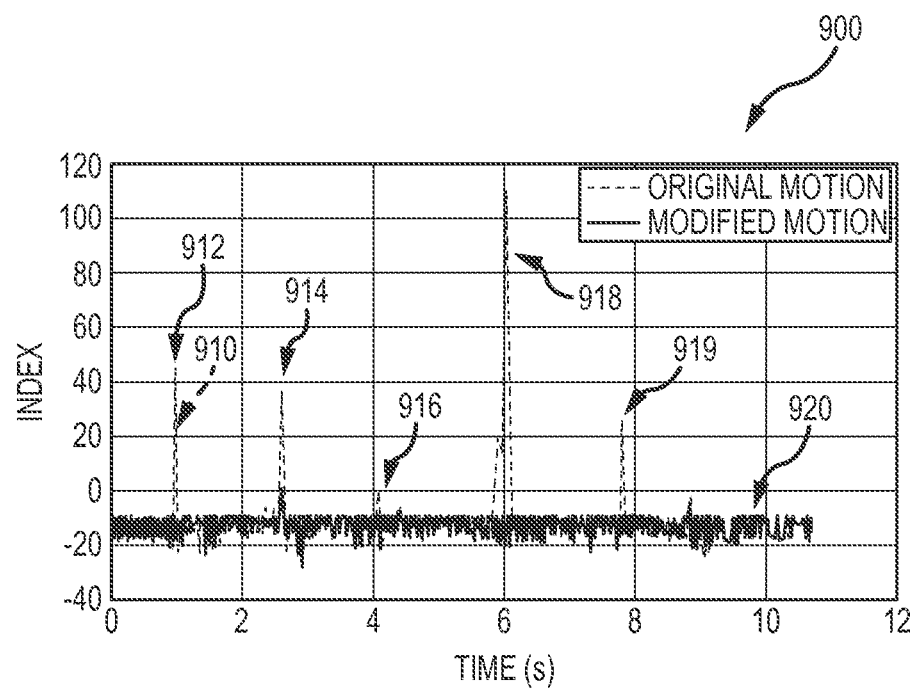
FIG. 9 is a graph with plots of the value of the motion feasibility index first for an input reference motion associated with climbing down stairs having infeasible motions for a robot and second for a motion of climbing down the same stairs after modification of the reference motion with time warping.
Figure 10A:
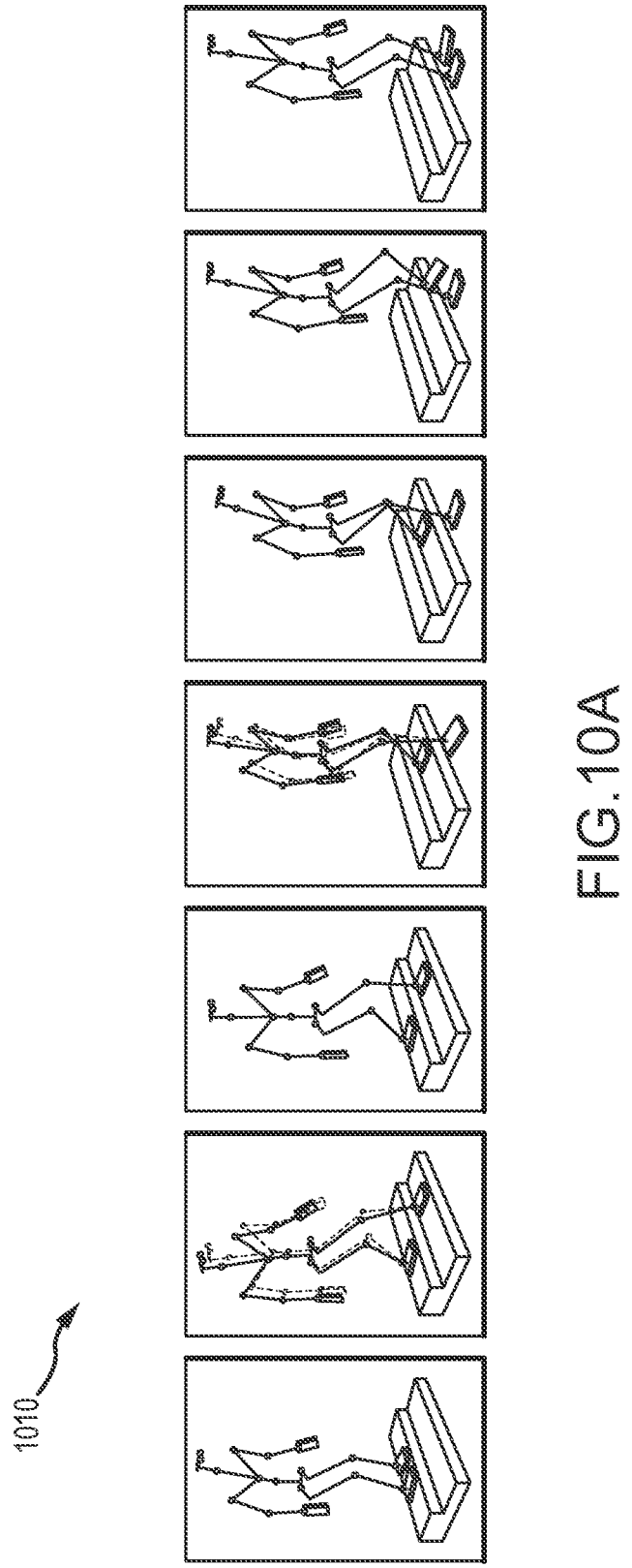
FIGS. 10A and 10B show series of snapshots comparing the original and modified motions of FIG. 9 and comparing simulated and modified motions of the robot.
Figure 10B:
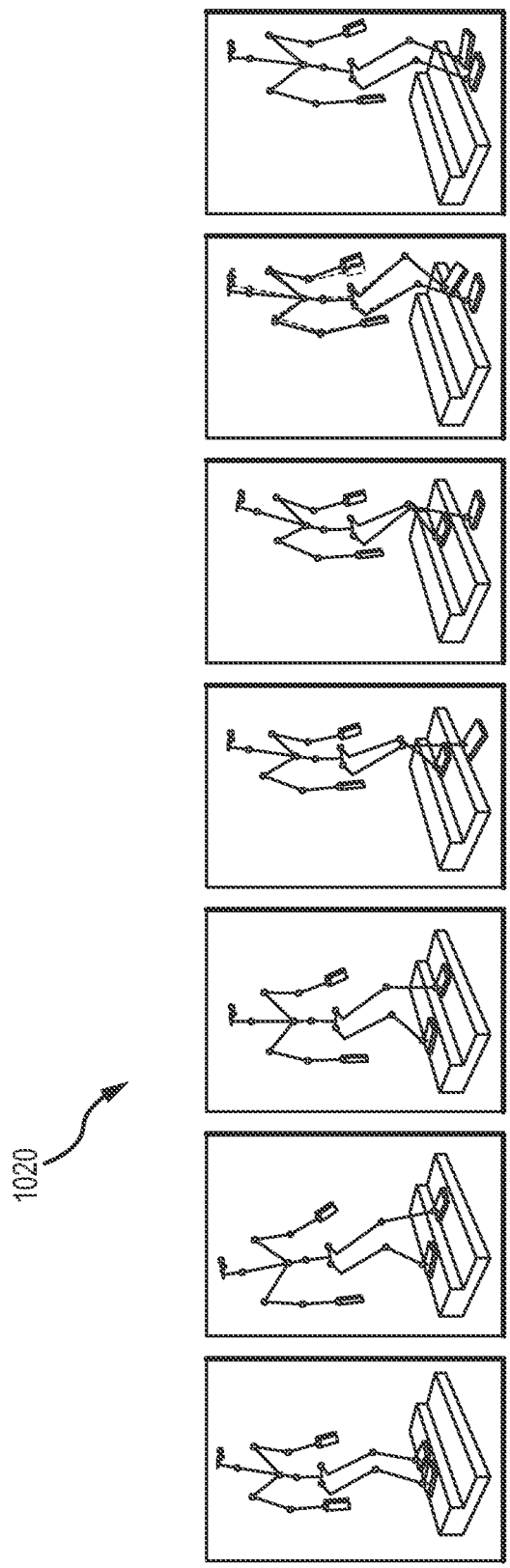

A third set of experiments were performed using the time warping-based control method to mimic with a robot a human walking downstairs. FIG. 9 plots the value of the calculated motion feasibility index with line 910 for an input reference motion (having infeasible motions at 912, 914, 916, 918, 919) and with line 920 for the motion after modification with time warping without changing poses (having the motions 912, 914, 916, 918, 919 performed at differing times to provide only feasible motions). FIG. 10A shows a series 1010 of snapshots comparing the original and modified motions of FIG. 9, with the solid robot representing the modified motion and the transparent/dashed robot representing the original or reference motion. FIG. 10B shows a series 1020 of snapshots of the simulated reference (shown with the solid robot) when the robot tries to reproduce the time warp-modified motion (shown with the transparent/dashed robot). Though the modified motion is still infeasible at some moments in this control experiment, its index value is just slightly above zero and the motion is still very close to a feasible motion. This small extent of infeasibility for such a short time period can be well handled by the motion tracking controller, and the robot can get back on track before going too far. That is why the simulated motion has not big deviation from the modified motion as shown in FIG. 10B.

Figure 11:
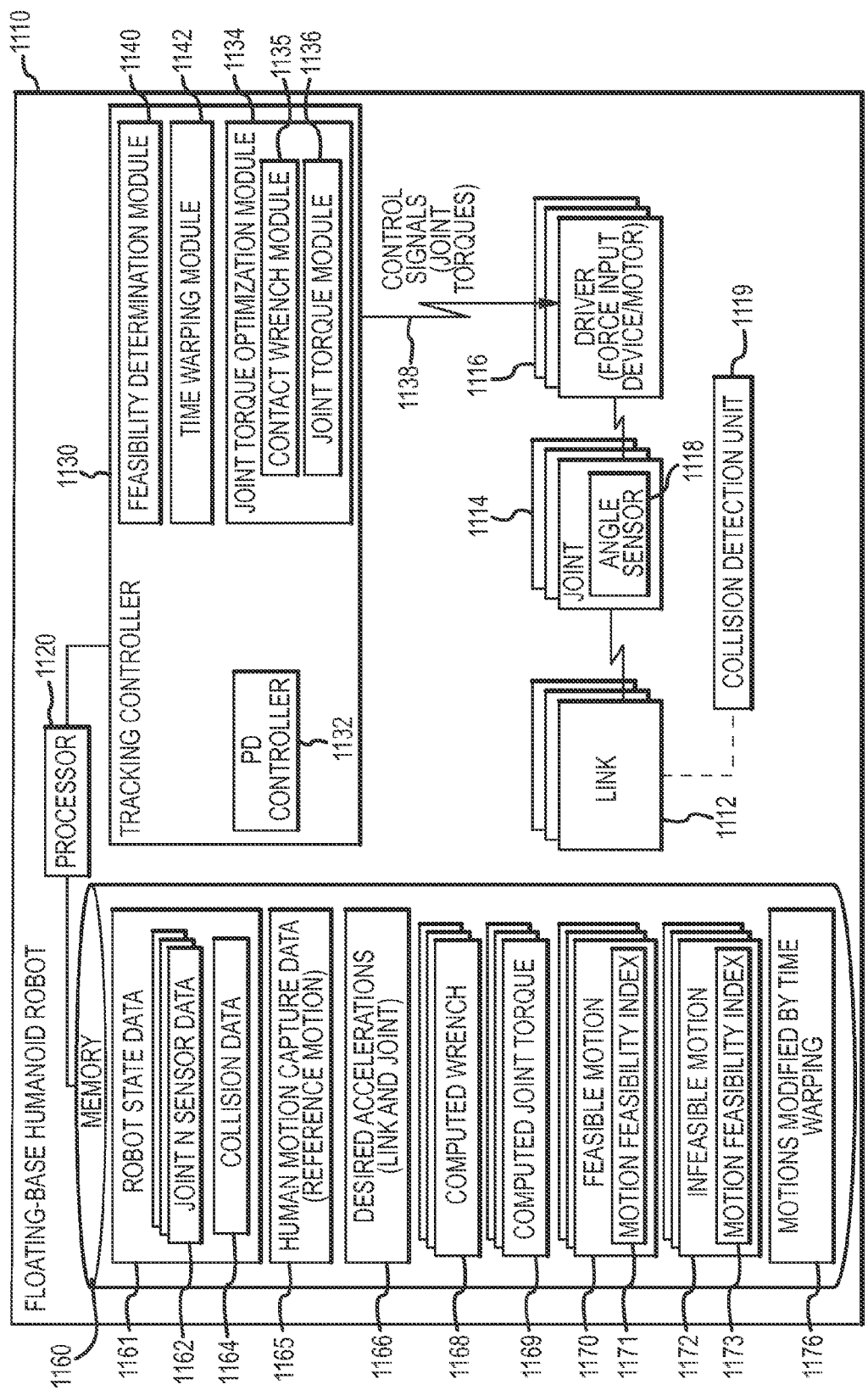
FIG. 11 is a functional block diagram of a floating-base humanoid robot including software or computer code that may be run to control the robot based on human motion capture data that is modified using time warping as described herein.

FIG. 11 is a functional block diagram of a floating-base humanoid robot 1110 including software or computer code (e.g., tracking controller 1130) that may be run (e.g., by processor 1120) to control the robot 1110 based on human motion capture data (or any other reference motions as discussed above) 1165 stored in memory 1160 (onboard or wirelessly accessed by the controller 1130). The motion capture data 1165 may be obtained from nearly any source such as conventional motion capture devices used to track motion of a human model/actor or from animation (e.g., keyframe animation as desired motion input) to provide the motion frames or motion segments to be processed by the controller 1130, and the human motion capture data 1165 is provided as input to a tracking controller 1130 to define the desired movement for the robot 1110 (e.g., the controller 1130 acts to try to track the movements defined by data 1165).

More particularly, as discussed above, the human motion capture data 1165 provides the reference motion that may or may not be feasible for reproduction by the robot 1110. The controller 1130 includes a feasibility determination module 1140 that acts to process these reference motions 1165 (or each motion of the frames or motion segments) to determine whether or not a motion is feasible and how far each is from being feasible (or infeasible). The process performed by the module 1140 is discussed in detail above and involves determination of a general motion feasibility index, and the memory 1160 is shown to store these determinations as shown with feasible motions 1170 each assigned a motion feasibility index 1171 (e.g., a negative index) and with infeasible motions 1172 also each assigned a motion feasibility index (e.g., a positive index).

The controller 1130 further includes a time warping module 1142 that processes at least the infeasible motions or motion segments 1172 by applying a time warping function so as to cause the motion segment to become feasible, e.g., by delaying or hastening the timing of performance of the motion by the robot 1110. In some cases, the feasible motions 1170 are also processed (or at least a subset with indices 1171 indicating the motions are nearly infeasible) to make the motions 1170 more feasible (e.g., further away from the feasibility-defining cone or the like). The modified motions 1176 are stored in the memory 1160 and used to define the desired accelerations 1166 rather than the human motion capture data 1165 (or input reference motions), which may at least in part be infeasible. As discussed above, the tracking controller 1130 may take a number of forms to practice the invention including the controller as taught in U.S. patent application Ser. No. 14/067,603, filed Oct. 30, 2013, which is incorporated herein in its entirety and which is discussed further below and with reference to FIG. 12. Note, in other embodiments, the modules 1140, 1142 may be provided offline or remote to the robot 1110 and the modified motions 1176 may be communicated to the robot 1110 for use in operating the robot 1110 with controller 1130 with feasible motions (or motions closer to being feasible).

Generally, the tracking control methods described herein may be used with nearly any floating-base humanoid robot 1110 that is a force-controlled robot that can be freely moved (not connected to a support) such as by moving its leg or other joints. As shown, the robot 1110 includes a number of rigid links 1112 that are joined or interconnected and movable with joints 1114. The links 1112 may be moved and positioned by operating a driver 1116 (e.g., a force input device such as motor, an actuator, or the like) to apply a joint torque on the joint 1114 in response to control signals (joint torques) 1138 received from a robot controller or tracking controller 1130 run by processor 1120.

Angle sensors 1118 are provided at each joint 1114 to output data or measurements indicative of an angle at the joint 1114, and the joint angle measurement or sensor data 1162 is stored in memory 1160 of the robot 1110 as part of the robot state data 1161 (which is used as input by the tracking controller 1130 to define strict contact constraints). The links 1112 may include a pair of feet with soles, and, during tracking control by controller 1130, these links 1112 are not constrained to be flat on a floor or other planar support platform or over uneven or nonplanar terrain/support surfaces.

The robot 1110 includes a processor or CPU 1120 that operates to manage the memory 1160 (e.g., store and retrieve data in digital form) and to run one or more programs (non-transitory computer readable medium). For example, the processor 1120 runs a tracking controller 1130 to control operations of the robot 1110 including outputting control signals or joint torques 1138. The torques 1138 are generated by the controller 1130 based on desired accelerations (for contact links and joints) 1166 computed by a PD controller 1132 and further based on the output of a joint torque optimization module 1134. The module 1134 is made up of: (1) a contact wrench module 1135 adapted to compute wrenches 1168 based on the desired accelerations 1166 (output of PD controller 1132), based on the actual robot state data 1161 and based on the desired contact state from human motion capture data after modification (time warping by module 1142 based on motion feasibility index values) to provide time-warped motions 1176 and (2) a joint torque module 1136 computing joint torques 1169 based on the desired accelerations 1166, based on the computed wrenches 1168 from the module 1135, and based on actual state data 1161.

The form of the robot controller 1130 is not limiting of the invention as long as the controller 1130 utilizes at least portions of the outputs of the two components 1135, 1136 (decoupled optimizers as described herein) of the tracking module 1134 to generate the joint torques 1138. In some embodiments, a computer outside of the robot 1110 is utilized to generate portions of the data shown stored in memory 1160 with this data being communicated (e.g., wirelessly) to the controller 1130 for use in generating the control signals 1138 transmitted to the drivers 1116 to move the robot 1110.

Figure 12:
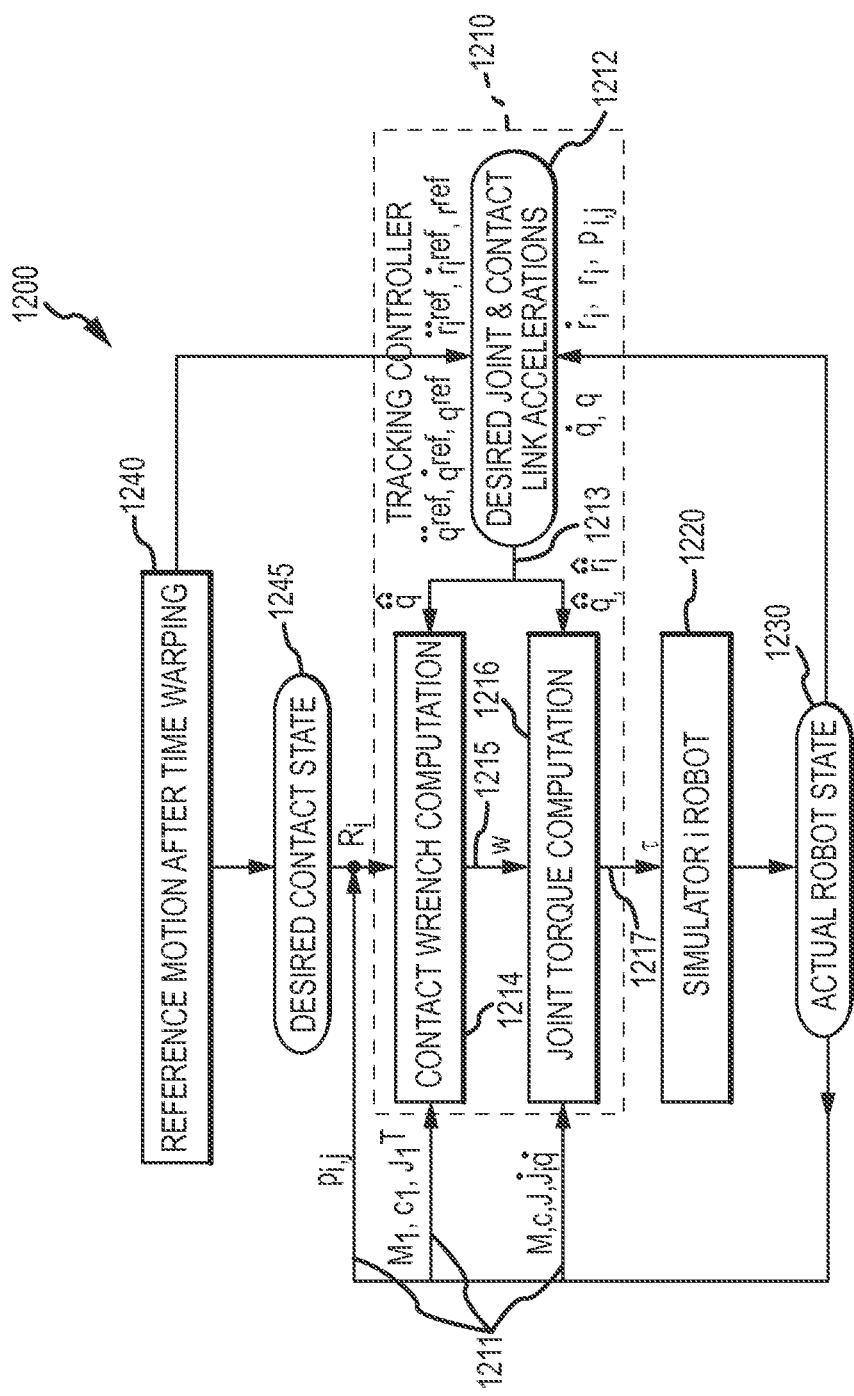
FIG. 12 illustrates a control method, with a data flow diagram, as may be carried out by operation of a tracking controller of the present description.

FIG. 12 shows a data flow diagram 1200 providing an overview of operation of a motion tracking controller 1210.

The tracking controller 1210 includes an initial step 1212 (e.g., as performed by a PD controller or the like) and, more importantly, includes two main steps performed at 1214 (contact wrench computation) and at 1216 (joint torque computation).

The PD controller step 1212 produces desired joint and contact link accelerations by processing the motion 1240, which has been modified by time warping based on determined motion feasibility index values (e.g., input data including motion capture data to be mimicked by floating-base robot but that may include infeasible motions) and the actual robot state data (the state may be determined at 1230 and include determined normals, collision detections, and the like such as to provide information as to where links and other portions of the robot are presently located in an environment, e.g., where the feet are located relative to the support surfaces/terrain).

Further, within the controller 1210, the step performed at 1214 involves computation of the contact wrenches 1215 via the computation of contact forces that satisfy the friction constraint and that realize the desired reference motion of the floating base as much as possible (based on the desired contact state 1245 from the motion capture data 1240 (e.g., use the same contact state 1245 as a human subject/actor when the motion 1240 was recorded)). In other words, the contact points are determined using the desired contact state 1245 from the time warp modified motions 1240 and the current contact link positions of the actual robot as shown as input at 1211 from state data collection step 1230. Since the robot may not be able to perform some of the modified motions 1240, the control method 1200 may involve, in some embodiments, determining at each link desired contact states 1245 (achievable contact states rather than taking these from the motion data 1240). Based on the computed contact wrenches 1215, the step performed by the controller 1210 at 1216 determines the joint torques 1217 that will realize all joint motions and especially the desired contact link motion, and the torques 1217 are passed in control signals to the simulator/robot 1220 to control its movements.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

This description has presented a control method, which can be implemented in a tracking or other controller of a floating base robot (such as a humanoid robot). The control method was based on the use of time warping for adapting human motions to humanoid robots by changing the time line of the input or reference motion. An advantage of this method is that it only changes the velocity and acceleration profiles of the motion and allows the robot to realize the same poses as in the reference motion. A general motion feasibility index was also taught that is used to identify infeasible motion segments for the robot in the reference motion. Then, each infeasible motion segment is modified through time warping. The proposed method has been tested on different human motions and has proven to be able to find feasible motions in most cases or at least to bring an infeasible motion close to a feasible one, which makes it easier and safer for the robot to reproduce those motions.

It will be understood by those skilled in the art studying this description that aspects of the control method may readily be extended in a number of directions or ways. For example, the control method may be used to modify nearly any input or reference motion for a variety of floating-base robots (e.g., not only for use with controlling a humanoid robot as this was just one working example described herein). Further, the choice of a time warping function can be arbitrary. However, it can be seen from FIG. 4B that a time warping function can either first speed up and then slow down the motion or do the reverse. It might be useful in some cases to identify whether a motion needs to be sped up or slowed down first to make it feasible, which will reduce the search scope of time warping functions and facilitate the use of the control method.

Additionally, the proposed motion feasibility index is general and applicable to motions happening on any terrain or in the case where a humanoid robot needs to contact the environment with links other than feet. Still further, the control method was taught to involve modifying a motion in the time domain. However, the control method may also involve modifying a motion in the joint or operation space as well based on the general motion feasibility index.

We claim:

1. A method for controlling a floating-base robot to track given reference motions, comprising:
    with a tracking controller, receiving as input a set of poses that define a motion for the floating-base robot at a time along a performance timeline;
    determining, with the tracking controller, whether the defined motion is infeasible for the floating-base robot;
    based on the determining, modifying, with the tracking controller, the set of poses whereby the defined motion becomes feasible for performance by the floating-base robot when the floating-base robot is moved through each of the poses; and
    after the modifying, controlling the floating-base robot with the modified set of poses,
    wherein the modifying comprises changing the time for performing at least one of the poses from a first time to a second time within the performance timeline,
    wherein the determining whether the defined motion is infeasible comprises calculating a motion feasibility index, and
    wherein the calculating of the motion feasibility index comprises determining whether contact forces satisfying a friction constraint generate a required wrench.

2. The method of claim 1, wherein the second time is selected to provide a minimal value of the motion feasibility index.

3. The method of claim 1, wherein the set of poses are obtained from human motion capture data.

4. The method of claim 3, wherein the floating-base robot comprises a bipedal humanoid robot.

5. The method of claim 1, wherein the set of poses comprise data from a key frame animation.

6. The method of claim 1, wherein the second time is selected such that each of the poses is performed in a sequence provided in the received set of poses.

7. A robot, comprising:
    a floating-base body comprising a plurality of links and torque-controlled joints; and
    a tracking controller comprising a controller module computing a desired acceleration to track movement through a set of poses by operating the torque-controlled joints and a time warping module modifying one or more of the poses to generate the set of poses tracked by the controller module,
    wherein the time warping module modifies a timeline defined for providing the modified set of the poses,
    wherein the tracking controller further comprises a feasibility determination module generating a motion feasibility index for the motion associated with the poses,
    wherein the modifying by the time warping module is performed based on values of the motion feasibility index for the motion, and
    wherein the generating of the motion feasibility index comprises determining whether contact forces for the floating-base body satisfying a friction constraint generate a required wrench.

8. The robot of claim 7, wherein the modifying of the timeline comprises changing a timing for placing the floating-based body in one or more of the poses.

9. The robot of claim 7, wherein the one or more of the poses include poses associated with an infeasible motion for the floating-base body.

10. The robot of claim 7, wherein the modified timeline is generated by the time warping module to reduce values of the motion feasibility index for one or more motion segments.

11. A method for controlling a floating-base robot to track a given reference motion, comprising:
    providing a set of poses defining movement for the floating-base robot at a plurality of times along a predefined timeline;
    with a processor running a feasibility determination module, calculating a motion feasibility index for the movement and, based on the motion feasibility index, determining whether the movement is infeasible for the floating-base robot; and
    in response to the determining, with the processor running a reference motion adapter, modifying the set of poses based on the motion feasibility index whereby the movement becomes feasible for performance by the floating-base robot,
    wherein the modifying comprises changing one or more of the times for placing the floating-base movement in one or more of the poses and
    wherein the calculating of the motion feasibility index comprises determining whether contact forces for the floating-base robot satisfying a friction constraint generate a required wrench.

12. The method of claim 11, wherein each pose in the set of poses remains unchanged.

13. The method of claim 11, wherein the modifying of the set of poses comprises modifying the timeline to provide a minimal value of the motion feasibility index for the movement.

* * * * *